United States Patent [19]
Baker

[11] 3,781,531
[45] Dec. 25, 1973

[54] FLAW DETECTOR SYSTEM UTILIZING A LASER SCANNER

[75] Inventor: Cole H. Baker, Westport, Conn.

[73] Assignee: Intec Corporation, S. Norwalk, Conn.

[22] Filed: June 23, 1972

[21] Appl. No.: 265,614

[52] U.S. Cl. .................. 235/151.3, 250/219 DF
[51] Int. Cl. .......................................... G01n 21/32
[58] Field of Search ............... 235/151.3, 151.35; 250/219 DF, 219 WE, 219 D, 219 QA, 219 Q, 219 R, 217 R, 217 SS; 340/347 CC

[56] References Cited
UNITED STATES PATENTS

| | | | |
|---|---|---|---|
| 3,026,415 | 3/1962 | Lake, Jr. et al. | 250/219 DF X |
| 3,652,863 | 3/1972 | Gaskell et al. | 250/219 DF |
| 3,061,731 | 10/1962 | Thier et al. | 250/219 DF |
| 3,534,402 | 10/1970 | Crowell et al. | 235/151.3 X |
| 3,586,864 | 6/1971 | Brany et al. | 250/219 DF |

Primary Examiner—Joseph F. Ruggiero
Attorney—Joseph Levinson

[57] ABSTRACT

A laser beam is scanned successively across a surface of material being analyzed, and the intensity of the beam, either reflected or transmitted from the material, is detected by a photomultiplier tube. In addition to output amplitude, variations due to scanning across material flaws, other photomultiplier output variations also occur. Such baseline variations are due to relative angle changes that occur between the laser beam and the material surface and other system-associated errors. The same optical and/or electrical variations that produce these baseline signals also cause corresponding amplitude variations of detected flaw signals. A flaw amplitude normalizer circuit is coupled to the detector for automatically normalizing the flaw signal to remove these errors by providing high and low-pass filters to separate the flaw signal from the baseline scanning signal, and these signals are ratioed to develop a normalized flaw signal. A threshold circuit is coupled to the flaw amplitude normalizer circuit for producing flaw output signals when the normalized flaw signals from the detector exceed a predetermined level. Outputs from the threshold circuit are applied to a flaw quantizer circuit which, using "0–1" logic to indicate a flaw area and discriminate against the same indication on successive scans which occur at the same position in the scan as the initial flaw indication, thus provides a single flaw indication for the same flaw, although it may occur on successive scans.

7 Claims, 14 Drawing Figures

FLAW DETECTOR SYSTEM UTILIZING A LASER SCANNER

BACKGROUND OF THE INVENTION

This invention relates to a flaw detection system, and more particularly to such a system utilizing a laser scanner which is capable of detecting flaws which might otherwise be missed due to signal variations caused by scanning or system changes in signal level. The flaw detection system further includes means for preventing multiple flaw indications of a single flaw which is produced by successive scans of the same flaw.

In the manufacturing process, certain surface flaws will from time to time occur even with the most rigid quality control program. The surfaces in which the flaws occur may be in the form of a continuous moving web of material, such as paper, film, plastic, etc., or in various piece parts of similar or different materials. Visual inspection by trained operators is both costly and inaccurate, particularly with respect to high speed production of continuously moving webs or material, or where the number of parts to be examined visually is prohibitive. Accordingly, flaw detection systems have been widely employed to monitor the inspection of materials for flaws. Laser scanner systems have been widely used, which apply a flying spot of high intensity light which is repetitively scanned across a moving sheet or piece part with light being reflected therefrom, to be received by a photomultiplier detector. If the material is translucent, the light may be directed through the material, and analyzed by the photomultiplier. Accordingly, at any instant of time during the scan, the photomultiplier output is proportional to the reflectivity or transmissivity of the spot upon which the laser beam is impinging. Flaws occurring on the surface of the material being examined change the output of the photomultiplier tube due to the reflective or transmissive properties of the material being examined, providing a means for indicating flaws on the surfaces. Generally, flaws are relatively small and flaw signals generated therefrom are usually of a much shorter time duration as compared to a single line scan cycle across the material. By means of frequency or time selective filtering, the short-duration flaw signal pulses can be separated and distinguished from the lower frequency components generated by the baseline scan. By processing the flaw signals through appropriate threshold circuitry, the flaw signals can be categorized in regard to amplitude, duration, and/or polarities.

When scanning across homogeneous flaw-free surfaces, a certain quantity of reflected or transmitted light is seen by the photomultiplier, producing a light level which is referred to as the baseline signal. As stated previously, the light level will increase or decrease from the baseline level as a result of a flaw in the surface of material being scanned. One of the problems involved with such systems is that the amount of light impinging on the surface of the photomultiplier when scanning flaw-free material is that this level does not remain constant. This light level varies as a function of the impingement angle of the laser beam on the material being scanned, as well as the relative angles and distances between the laser beam and the photomultiplier. Additionally, the type of surface being examined also affects the amount of light impinging on the photomultiplier. Furthermore, changes in the characteristics of the optical and electrical apparatus with age and/or use change the signal level which will be produced by the photomultiplier tube even though it is not scanning a flawed area. The problem of the changing baseline signal when no flaws appear on the surface increases the difficulty in flaw detection, where some flaws are missed entirely, and other flaws are indicated where none exist.

One approach to the problem of changes in flaw signal amplitude associated with the relative position of the laser beam during a normal scan cycle involves optically compensating the relative light level received by the photomultiplier as a function of the scan angle. A vignetting mask was used to reduce the light reflected from the sheet to the photomultiplier tube at those scan angles which produced larger flaw signals than other scan angles, and to increase the light falling on the photomultiplier for smaller flaw signals which were such due solely to the scan angle. The vignetting mask was then empirically adjusted for all other in-between scan positions to provide a normalized flaw output signal where equal size and type flaws would presumably produce an equal signal, irrespective of its location along the scan line. However, the vignetting mask technique is difficult to implement, and variations of the material surface characteristics, as well as any changes in the laser-to-material scan angle or relative photomultiplier position, necessitate a complete reshaping of the vignetting mask. Furthermore, there is no way to implement an automatic operation for such changes.

Another drawback of prior art flaw detection systems utilizing laser scanners involves repetitively seeing the same flaw on successive scans, and producing false multiple-flaw indications where only the first indication is desired. Prior flaw detection systems count the same large flaws many times, while even minute flaws produce multiple counting if the scanning speed is slow enough. Also, extended flaws which vary a slight angle with the direction of surface travel have been multiply counted where only a single flaw existed.

Accordingly, it is an object of this invention to provide a new and improved flaw detector system which overcomes some of the aforesaid problems associated with prior art systems.

A further object of this invention is to provide a new and improved flaw detection system utilizing a laser scanner which is capable of detecting flaws in surfaces of material regardless of the position of the flaw on the material being scanned.

A still further object of this invention is to provide a new and improved flaw detector system which automatically compensates for scanning and system error, thus providing a greater capability for detecting flaws.

Another object of this invention is to provide a new and improved flat detection system which provides a single flaw indication for a continuous flaw which covers successive scan lines even when such flaw is slightly skewed to the direction of scanning on the surface of the material being analyzed.

SUMMARY OF THE INVENTION

In carrying out this invention in one illustrative embodiment thereof, a laser beam is successively scanned across a surface of material being analyzed, and a detector means is positioned for receiving radiation applied by the laser beam from the surface for producing a signal in response to the intensity of the radiation received. A flaw-amplitude analyzer circuit is coupled to the detector for automatically adjusting flaw signal amplitudes along the scan lines such that flaws of similar characteristics have the same amplitude no matter where they are positioned along the scan line. A threshold circuit is coupled to the flaw amplitude normalizer circuit for producing a flaw signal output when such signals exceed a predetermined level, which signals are applied to a flaw quantizer circuit which counts single flaws along the surface being scanned and discriminates against the same flaw signal which appears in successively scanned lines.

DESCRIPTION OF THE PREFERRED EMBODIMENT

The present invention is described and illustrated using a moving sheet or web of material, with the detector positioned to receive the reflected light from such material. It should be understood that the invention is equally applicable to flaw detection of piece parts or devices whose surfaces are to be examined for defects in which such parts move along a conveyor or other suitable means. The parts may also be stationary and the scanning done in raster form by known methods. If the materials being examined are translucent, the system would also be applicable for measuring the light transmitted through the material for flaw detection instead of the use of reflected light as shown.

Figure 1:
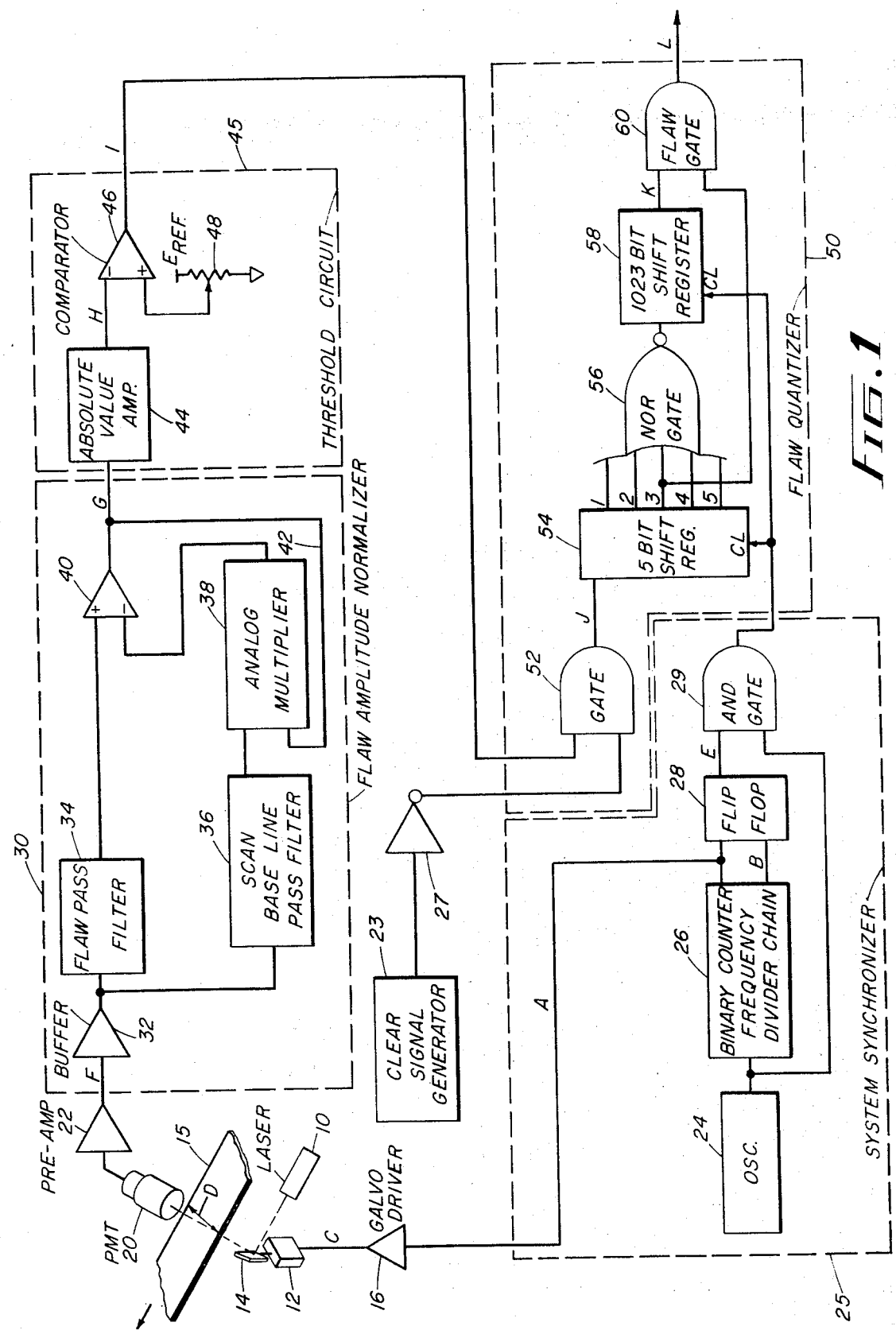
FIG. 1 is a schematic block diagram illustrating a preferred embodiment of the improved flaw detector system.
Figure 2:
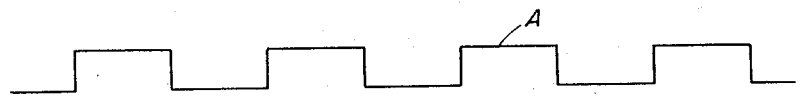
FIGS. 2–13 show wave forms which are used to illustrate the operation of the flaw detector system shown in FIG. 1.
Figure 3:
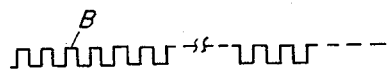
Figure 4:
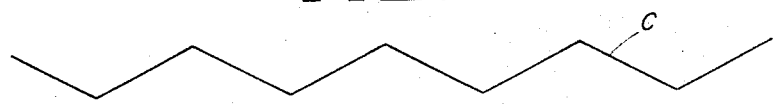
Figure 5:
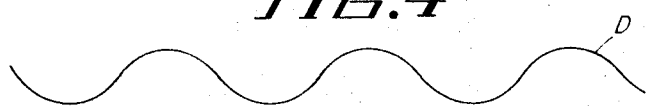
Figure 6:
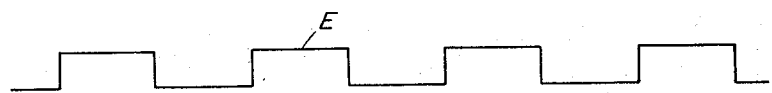

Referring now to FIG. 1 of the drawings, a conventional laser 10 of any suitable type, such as helium-neon or argon ion gas lasers, or other types which are capable of generating a laser beam of monochromatic light in a predetermined spot size, is scanned by a galvanometer mirror 14 successively across a web of material 15 which is continuously moving in the direction shown. Scanning across the web is achieved by using an oscillator 24 in the flaw system synchronizer 25 which feeds a binary counter frequency divider 26 to produce at its output a signal of waveform A shown on FIG. 2 which for purposes of illustration may be 1 khz. Waveform A is applied to a galvanometer driver 16 whose output waveform C is shown in FIG. 4 in the form of a synchronous triangular drive waveshape which is applied to and powers a high speed galvanometer 12. The mirror 1 on the galvanometer 12 reflects the laser beam from the laser 10 and causes it to scan back and forth across the surface of web 15. Scanning in the orthogonal direction to create a raster is done automatically by the moving web 15. As is indicated on FIGS. 4 and 5, the laser beam scanning position, waveform D, time lags the galvanometer drive, waveform C. A logic signal, waveform E in FIG. 6, is delayed by a flipflop circuit 28 which has waveform B of FIG. 3 (e.g. 8 khz) applied thereto from the binary counter frequency divider 26 so that waveform E is synchronous with the scan position of the laser beam, and its usage will be covered hereinafter.

Figure 7:
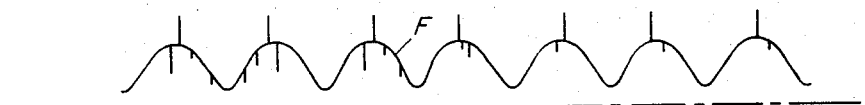

The laser beam scanning is generally perpendicular to the direction of the web motion to provide complete coverage of the surface of the web 15 as the web 15 moves under the scanning beam. Light reflected from the surface of the web 15 is received by a detector such as photomultiplier tube 20, the output of which is amplified in a preamplifier 22 and shown as waveshape F in FIG. 7. The waveform F consists of a baseline signal associated with scanning the surface of web 15 whether any flaws exist or not. It will be noted in the particular example that the baseline signal is greater near the center of the web and tapers off at the edges. Any flaws which exist in the surface of the web 15 will produce flaw signals at the output of the photomultiplier 20 which are superimposed on the baseline signal. The flaw signals are short duration pulses that correspond to scanned flaws which are shown in waveform F of FIG. 7 as different amplitude positive and negative signals corresponding to the type of flaw which is detected. The flaw amplitude of the waveform F is a combined function of the magnitude of the scanned flaws as well as their position along the scan line.

Figure 8:
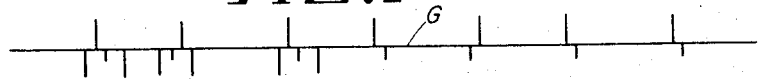

The output of the preamplifier 22 in the form of waveform F is applied to a flaw amplitude normalizer circuit 30 whose function is to normalize, or even out, the varying baseline signal due to scanning and other system errors. Waveform F is applied to a buffer amplifier 32. The output of the buffer amplifier 32 is applied to two channels, first a flaw-pass filter 34 which is in the nature of a high pass filter and passes only the short duration flaw signal pulses, and thus separates them from any residual scan signals. In the other channel, the waveform F signal is applied to a scan baseline filter which is a low-pass filter 36 for passing the lower frequency baseline scan signals and blocking the higher frequency flaw signals. The output of the scan baseline filter 36 is applied to one input of an analog multiplier 38. The output of the flaw-pass filter 34 in the form of flaw signals is applied to an operational amplifier 40 whose output is applied via a feedback path 42 to the other input of the analog multiplier 38. The output of the analog multiplier 38 is connected to the other input of the operational amplifier 40. In view of this negative feedback arrangement, the output of the operational amplifier 40 driving the input of the analog multiplier 38 which in turn drives one of the inputs to the operational amplifier 40, the non-normalized flaw signals produced at different points along the scan line are divided by the baseline signal level present at the corresponding positions along the scan line. This ratioing of the flaw signals and the baseline signals results in the automatic normalizing of flaw signal amplitudes and is shown in FIG. 8 as waveform G which appears at the output of the flaw amplitude normalizer 30.

It should be noted that the flaw amplitude normalizer circuit 30 also eliminates flaw signal amplitude variations that occur due to causes other than those associated with purely scanning. If surface reflectivity, laser light output, or photomultiplier and its associated amplifier gain changes occur, such changes would also affect the flaw output signal levels. In such a case, baseline signal levels would increase and decrease proportionately with such signal level changes. However, the ratioed flaw-signal-to-baseline-signal amplitudes would remain unchanged due to the flaw amplitude normalizer cirucit 30. This self-adjusting feature eliminates the need for trimming to accommodate long-term gain variations within the system.

Waveform G is fed from the flaw amplitude normalizer circuit 30 to a threshold circuit 45 which accommodates both positive and negative flaw output signals. Waveform G is applied to an absolute value amplifier 44 which full-wave rectifies the normalized flaw signals of waveform G, producing waveform H shown in FIG. 9. Waveform H is applied to a comparator 46 having a predetermined threashold level set by a potentiometer 48. Accordingly, flaw pulses which exceed the predetermined threshold of comparator 46 produce a "0-1" logic drive signal of waveform I shown on FIG. 10. These logic signals contained in waveform I are applied to a flaw quantizer circuit 50. Thus, the threshold circuit 45 produces repetitive output pulses corresponding to successive scans passing along any single flaw that may be present on the surface of the material 15. The purpose of the flaw quantizer circuit 50 is to pass only the first pulse produced, and to reject any subsequent flaw pulses that occur at the same scan position during adjacent successive scan intervals.

The input of the flaw quantizer circuit 50 is comprised of a gate 52 which is fed at one input thereto from the threshold circuit 45 and at the other input thereto from a clear signal generator 23 applied through an amplifier 27. The purpose of the clear signal generator 23 is to set the logic of the quantizer 50 for a complete scan interval. This may be done manually, as would be the case for a moving web such as 15, or it may be done automatically, utilizing a source-photodetector combination to monitor and detect the edge of the piece part which is being scanned. The gate 52 is connected ta five-bit shift register 54 which is coupled to a NOR gate 56, and from there to a 1,023-bit shift register 58. The output of the 1023-bit shift register 58 is applied to a flaw gate 60 whose output corresponds to the quantized flaws. The flaw quantizer 50 is also fed with synchronized delayed clock pulses from the oscillator 24 of the system synchronizer 25 through its output AND gate 29. The output of the gate 29 is coupled to both shift registers 54 and 58.

In operation, a clear signal is applied from clear signal generator 23 just prior to initiating the quantizer operation for the time duration of a complete scan interval. The clear signal causes a logic 0 input level to be applied to the serial input of the five-bit series-to-parallel shift register 54. During the scanning interval corresponding to the delay 1-khz signal (waveshape E being at logic 1), high frequency clock pulses are gated by the AND gate 29 from the oscillator 24 into the flaw quantizer circuit 50 These pulses which are applied to the shift register 54 shift the input clear logic 0 signal into the five-bit shift register 54, causing the output of the five-input NOR gate 56 to go to the logic 1 level. In turn, subsequent clock pulses cause logic 1 signals to be entered into all the stages of 1,023-bit shift register 58. At the termination of the clear signal, one input to the flaw AND gate 60 will be at logic 1 level (1,023-bit shift register output 58) and the other input (bit 3 of the five-bit shift register 54) will be at the 0 logic level. Simultaneously, the AND gate 52 at the input of the flaw quantizer 50 will be enabled, and any subsequent threshold flaw signals will be transferred to the five-bit shift register's serial input terminal.

Figure 12:
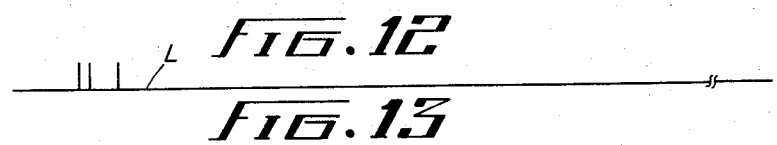
Figure 13:

Whenever the 1 khz delayed signal waveform E is at 1 logic, scanning across the material is being effected in one direction, and whenever this signal is a 0 logic, which is the reverse direction, retrace scanning is occurring. During the logic 1 intervals, clock pulses from the system synchronizer 25 causes any threshold flaw signals to be transferred into and through the five-bit shift register 54. The first clock pulse subsequent to the appearance of the flaw signal transfers the logic flaw signal to the first shift register 54 output. This produces a logic 0 at the five input NOR gate output, which in turn is transferred into the 1,023-bit shift register 58 on the next clock pulse. The third clock pulse causes the flaw data to appear at the third place upward of the shift register 54, and also produces a logic 1 at the output of the flaw gate 60. The input corresponding to waveform K of FIG. 12 is also at logic 1 because of the prior clear operation and the waveform L of FIG. 13 is produced at the output of the flaw gate 60.

Logic 1 level flaw data continues to be clocked into the five-bit shift register 54 until the termination of the flaw signal out of the threshold circuit 45. Then logic 0 signals will be passed into and through the shift register until the next flaw signal again initiates the transference of logic 1 signals. During the time duration corresponding to two clock pulses before, and two clock pulses after the flaw data appears at the three bit output of the five-bit shift register 54 logic 0 signals are being entered into the 1,023-bit shift register 58. During the first complete scan interval, subsequent to clearing the flaw quantizer 50, the 1,023-bit shift register is loaded with logic 0 signals whenever flaw signals are detected. The logic 0 bit positions in the register at the completion of the scan correspond to the flaw positions along the scan line. During the retrace interval, the clock pulses from the oscillator 24 are disabled, and the flaw position data is held in the register.

When the next scan interval occurs, logic 0 signals will appear at the output of the 1,023-bit register 58 in coincidence with the laser beam scanning across surface areas where flaws have previously been detected. In addition, the duration of logic 0's continues for five clock pulses subsequent to the laser beam scanning past the area where previous flaws were detected. During the time intervals, when logic 0's appear at the 1,023-bit shift register output, the flaw gate 60 blocks any flaw signals that may appear at the third place output of the five-bit shift register, and these flaw signals will not appear at the flaw gate output. Note that the stored data in the 1,023-bit shift register straddles the third bit output data by two bits. However, any new flaws scanned at other locations will still be passed through on this scan, and will be blocked on subsequent successive scans. Any perpendicular flaw stored at a corresponding position location will automatically be cleared when a scan occurs that does not produce a flaw in that scan position. Thus, as indicated by the waveform L of FIG. 13, only one output pulse per flaw is produced at the flaw quantizer output irrespective of the multiple scans occurring over the same flaw area. Because of the overlap provided by this arrangement, extended flaws that are at some angle to the direction of the surface are also accommodated and only counted as single flaws. Successive horizontal scans will produce flaw signals positioned slightly before or after the immediately prior flaw signal. A false output would only result if the angle of the flaw is sufficient to produce an output pulse shifted in time by more than two clock pulses during any two immediately successive intervals. If additional skew accommodation is desired, the five-bit shift register length can be increased. However, since extremely skewed flaws occur seldom in comparison with other types of flaws, the illustrated arrangement is deemed adequate to satisfy most requirements. In fact, for some applications, the five-bit shift register can be replaced with a three-bit register.

Another desirable feature of the flaw quantizer 50 is that it can be used to eliminate unwanted edge scanning signals that would appear as pulses at the output of the photomultiplier tube and would appear as flaw output signals if not eliminated. With the quantizer circuit 50, only during the first scan subsequent to clearing will edge over-scan produce a flaw indication. On all subsequent overscans, the edge signals will be blanked. Thus, by subtracting the initial overscan flaw count (maximum will be 2), the resulting flaw indications correspond only to the actual flaws on the sheet. It is also possible to determine the length or duration of a single flaw by the number of times such flaw is not counted by the flaw quantizer 50.

Figure 14:
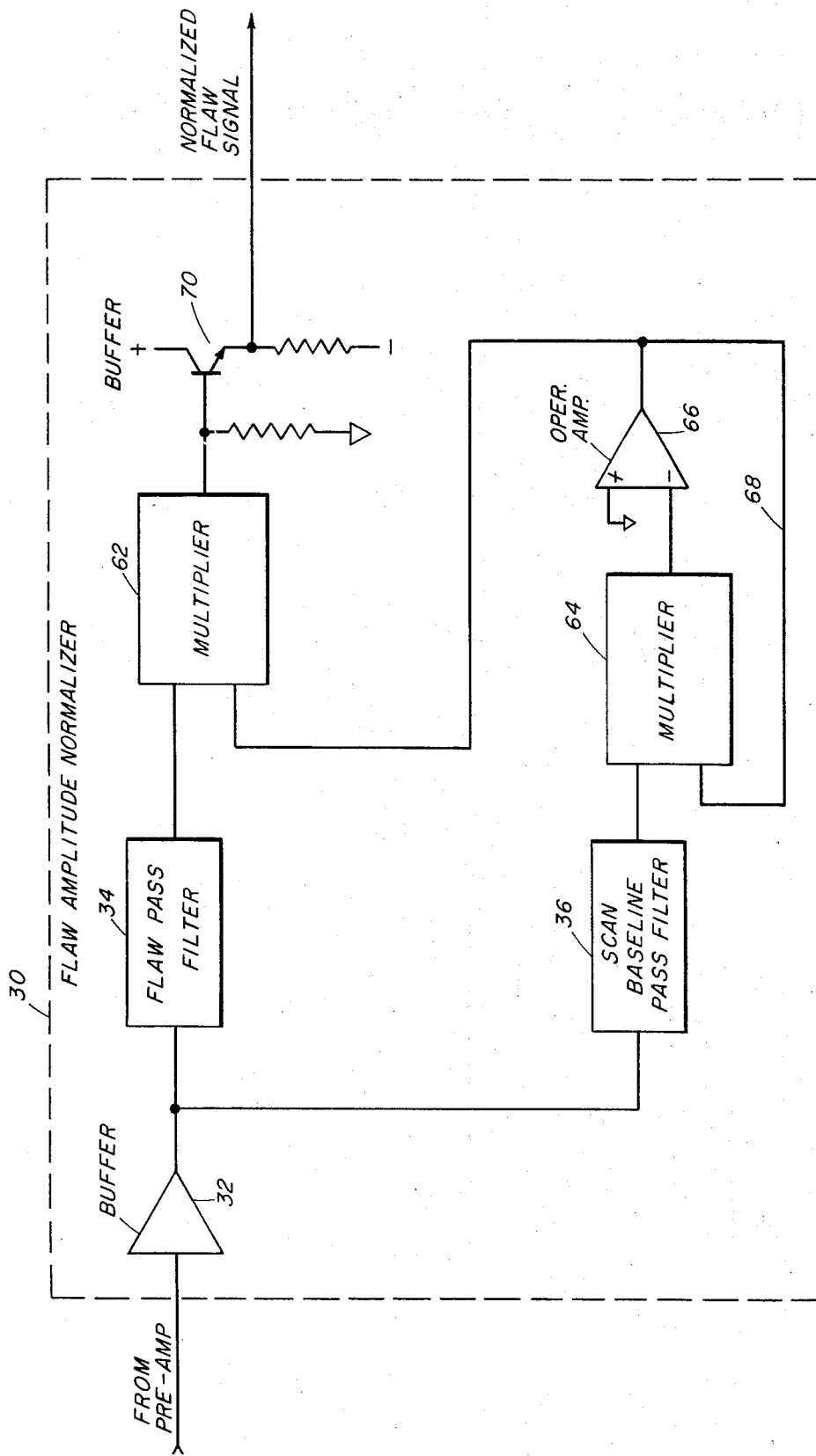
FIG. 14 is a schematic block diagram of another embodiment of a flaw amplitude normalizer circuit which may be utilized in the system shown in FIG. 1.

FIG. 14 shows another embodiment of a flaw amplitude normalizer circuit which is useful for the system of FIG. 1 and the same elements and waveforms will be designated with the same reference characters as those in FIG. 1. The output of the preamplifier 22 is applied to the flaw amplitude normalizer circuit 30 whose function is to normalize, or even out, the flaw signals caused by the varying baseline of the signal, as previously explained. Waveform F is applied to a buffer amplifier 32. The output of amplifier 32 feeds a flaw pass filter 34 which is a high-pass type filter for passing only short duration flaw signals to a multiplier circuit 62. The output of the buffer 32 also feeds the scan baseline pass filter which is a low-pass type filter for passing the lower frequency baseline signal. The output of filter 36 is sent to another multiplier circuit 64. Multiplier 64 in conjunction with an operational amplifier 66 with the appropriate feedback loop 68 comprises a circuit which produces the reciprocal function of the input baseline signal. This reciprocal function is sent to the first multiplier 62 with the following result. The flaw signal passes through the flaw pass filter 34 and is multiplied by the reciprocal of the baseline signal, thus normalizing or equalizing the flaw signal. The output of the multiplier 62 is buffered by emitter follower 70 to prevent loading and slowing down the frequency response of the flaw amplitude normalizer circuit 30. The output of the flaw amplitude normalizer circuit 30 provides automatic normalization of the flaw signal amplitude as shown by waveform G of FIG. 8.

The advantage of the flaw amplitude normalizer circuit 30 of FIG. 14 resides in the fact that the frequency response of the amplifier 66 used to produce the reciprocal function need not be very wide. Also, the frequency response of the normalizer circuit 30 is restricted only by the multiplier 62 passing the high-frequency, short-duration flaws.

Figure 9:
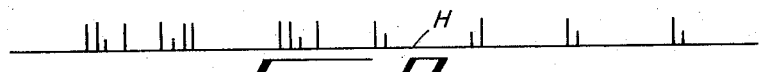
Figure 10:
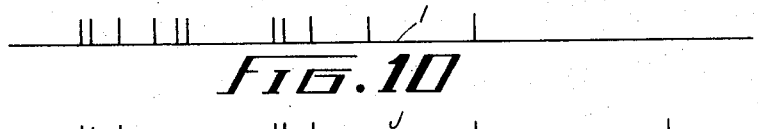
Figure 11:
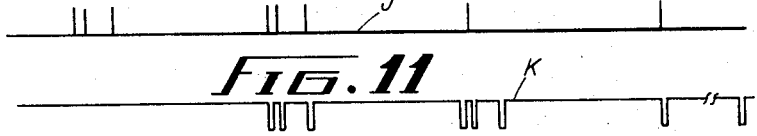

As illustrated in waveform H of FIG. 9, the system illustrated in FIG. 1 does not provide polarity indications, but various modifications could be made to provide whatever additional information is desired. For example, it may be advantageous to know the quantity and polarity of the flaw, which information is contained in the normalized flaw signal of waveform G. Separate circuits such as routing circuits could be provided to direct flaws into appropriate counters to provide additional information such as number of positive flaws, number of negative flaws, gross number of flaws, etc. All of these flaw indications could be qualified by separate amplitude levels, tracking levels or equal amplitude levels which then might use individual flaw quantizer circuits in accordance with the information desired to be extracted.

The above described flaw detection system employing the flaw amplitude normalizer and flaw quantizer provide solutions to problems associated with laser scanning inspection of surfaces that previously either were not solved or only partially solved in manners difficult to implement. This system may be utilized with a wide variety of materials and may be employed for web-form surfaces or discontinuous surfaces, such as piece part surfaces, without system degradation. Changes in the surfaces to be examined, scanning angles and distances, and system gain changes due to aging, drift, etc., are all compensated for to enhance the flaw detection. Continuous, or slightly skewed continuous flaws are counted as single flaws, and edge pulses are effectively eliminated, utilizing the same quantizer system. Although a digital mode is illustrated for the quantizer system, an analog mode, such as delay lines, etc., could also be used.

Since other modifications, varied to fit particular operating requirements and environments, will be apparent to those skilled in the art, this invention is not considered limited to the examples chosen for purposes of illustration, and covers all changes and modifications which do not constitute departures from the true spirit and scope of this invention.

I claim:

1. A flaw detection system utilizing a laser scanner for detecting flaws on a surface of material, comprising
   a. a laser for emitting a beam of radiation,
   b. means for successively scanning said laser beam across a surface of material being analyzed,
   c. detector means for receiving radiation applied by said laser beam from said surface producing a signal in response to the intensity of the radiation applied to said detector means,
   d. flaw amplitude normalizer means coupled to said detector for automatically normalizing flaw signal amplitudes which vary due to scanning and changes in the electrical characteristics of the system comprsing a high-pass filter for passing flaw signals from said detector means, a low-pass filter for passing scan baseline signals from said detector means, and means for ratioing said flaw signals with said baseline signals to normalize said flaw signals along the length of the scan line, and
   e. threshold circuit coupled to said flaw amplitude normalizer means for producing a flaw output signal when the signals from said detector means exceed a predetermined level.

2. The flaw detection system set forth in claim 1 wherein said means for ratioing said flaw signals with said baseline signals comprises an analog multiplier circuit coupled to said low-pass filter, an operational amplifier coupled to said high-pass filter and said analog multiplier circuit, and means for coupling the output of said operational amplifier to the input of said analog multiplier circuit.

3. The flaw detection system set forth in claim 1 wherein said means for ratioing said flaw signals with said baseline signals comprise an analog multiplex circuit coupled to said high-pass filter, means coupled between said low-pass filter and said analog multiplier circuit for applying the reciprocal of said scan baseline signals to said analog multiplier circuit whereby the output of said analog multiplier circuit provides normalized flaw signals.

4. The flaw detection system of claim 1 including a flaw quantizer circuit coupled to said threshold circuit for passing an output indicative of a flaw only on the first occurrence of a flaw signal during a scan interval, and rejecting subsequent flaw signals during adjacent successive scan intervals which occur at the same scan position.

5. The flaw detection system of claim 4 wherein said flaw quantizer circuit comprises
   a. an adjustable delay means coupled to said threshold circuit for expanding said flaw signals from said threshold circuit,
   b. scan interval delay means coupled to said adjustable delay means for producing a delayed flaw signal approximately one scan interval after such flaw signal is received from said threshold circuit, and
   c. flaw gate means coupled to said scan interval delay means and said adjustable delay means for passing an output indicative of a flaw only on the first occurrence of a flaw signal during a scan interval, and rejecting subsequent flaw signals during adjacent successive scan intervals which occur at the same scan position.

6. A flaw detection system utilizing a laser scanner for detecting flaws on a surface of material, comprising
   a. a laser for emitting a beam of radiation,
   b. means for successively scanning said laser beam across a surface of material being analyzed,
   c. detector means for receiving radiation applied by said laser beam from said surface producing a signal in response to the intensity of the radiation applied to said detector means,
   d. threshold circuit means coupled to said detector means for producing a flaw output signal when the signals from said detector means exceed a predetermined level, and
   e. a flaw quantizer circuit coupled to said threshold circuit for passing an output indicative of a flaw only on the first occurrence of a flaw signal during a scan interval, and rejecting subsequent flaw signals during adjacent successive scan intervals which occur at the same scan position.

7. The flaw detection system set forth in claim 6 wherein said flaw quantizer circuit comprises
   a. an adjustable delay means coupled to said threshold circuit for expanding said flaw signals from said threshold circuit,
   b. scan interval delay means coupled to said adjustable delay means for producing a delayed flaw signal approximately one scan interval after such flaw signal is received from said threshold circuit, and
   c. flaw gate means coupled to said scan interval delay means and said adjustable delay means for passing an output indicative of a flaw only on the first occurrence of a flaw signal during a scan interval, and rejecting subsequent flaw signals during adjacent successive scan intervals which occur at the same scan position.

\* \* \* \* \*